May 4, 1948. W. H. HARLESS 2,440,898
SAW SETTING AND FILING DEVICE
Filed Dec. 5, 1946 2 Sheets-Sheet 1
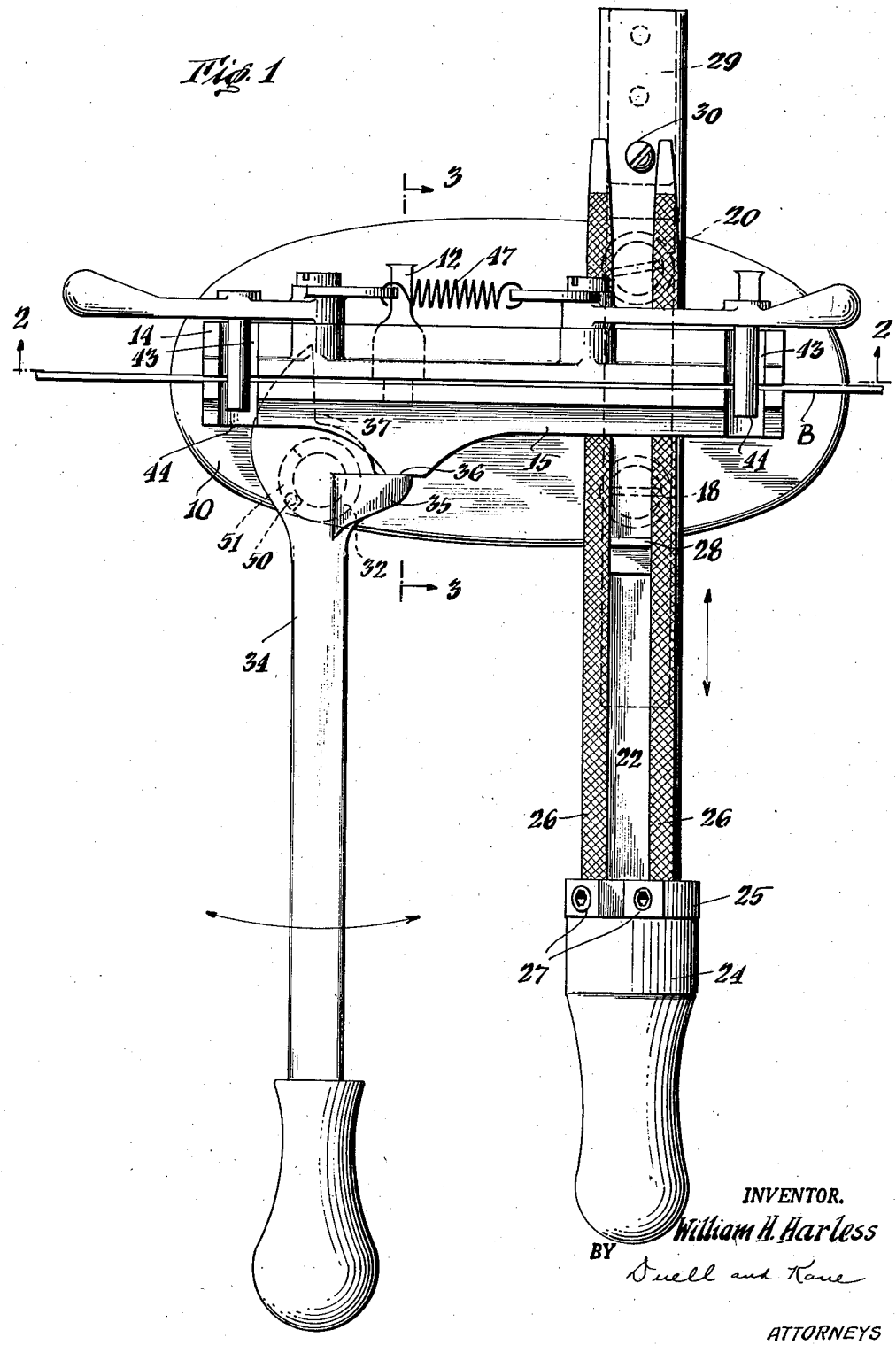
INVENTOR.
William H. Harless
BY
Duell and Kane
ATTORNEYS

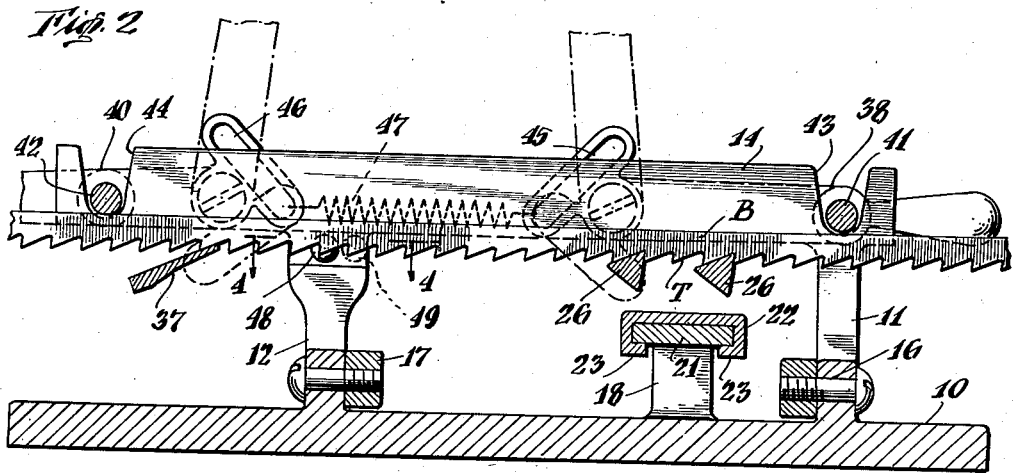
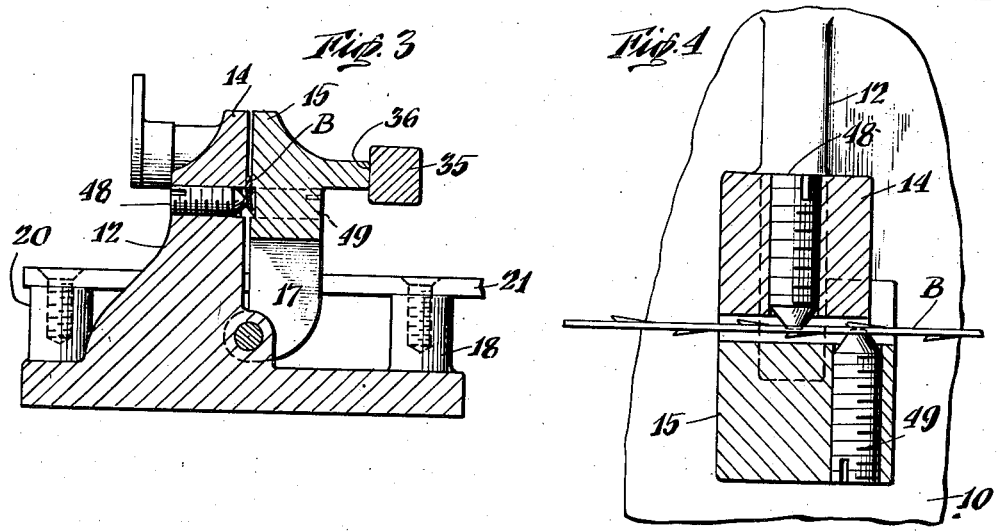
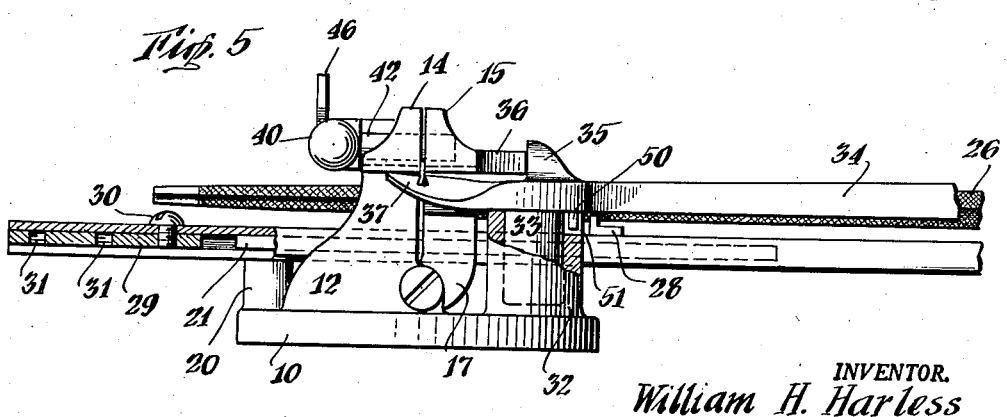

Patented May 4, 1948

2,440,898

UNITED STATES PATENT OFFICE 2,440,898

SAW SETTING AND FILING DEVICE

William H. Harless, East Moriches, N. Y.

Application December 5, 1946, Serial No. 714,327

5 Claims. (Cl. 76—31)

This invention relates to means for setting and sharpening saw blades, and particularly blades of the bandsaw type.

It is an object of the invention to provide a simple tool which will clamp or secure a blade for sharpening and will automatically reset, or adjust the setting of, the teeth of the blades.

It is another object of the invention to provide a tool within which a circular blade such as a bandsaw blade may be sharpened and set, means being provided to advance the blade uniformly so that the teeth thereof will be brought successively in operative relation to the files or the like which are employed to sharpen the same.

It is an object of the invention to provide a tool for sharpening elongate saw blades, said tool incorporating means reciprocally mounting a plurality of files or like sharpening devices, and means for mechanically disposing the unsharpened teeth in proper registry with said files, said last named means serving additionally to adjust the set of the teeth as desired.

It is another object of the invention to provide a simple, manually operable, tool for sharpening and setting the teeth of bandsaw blades and the like, said tool being capable of proper use by relatively unskilled workmen.

In a preferred form of the invention the device comprises a vise or clamp having a passage along which the saw blade may travel. Associated with said clamp is a reciprocating mount which supports, in a properly aligned relationship, the files or the like used to sharpen the saw teeth. The movable jaw of the clamp is operated by a pivoted arm which when moved in one direction relaxes the clamp and engages the saw blade to advance it in the direction of the files; said clamp, when brought into clamping relationship, causes pressure to be exerted on adjacent saw teeth to adjust or correct the set thereof.

The tool is of such small size as to be secured to a work bench or the like. The saw blade is automatically advanced and clamped in position for the sharpening operation, which comprises drawing the reciprocally mounted files across the teeth. The saw blade is uniformly and correctly positioned with respect to the files, and the operator is thereby relieved of any responsibility in the matter of placing the saw blade or adjusting the height or angular relationship thereof. Adjustment of the set of the teeth is likewise completely automatic, as will be apparent as the description of the invention progresses.

In the accompanying drawings:

Fig. 1 is a top plan view of the complete device in operative position;

Fig. 2 is a vertical elevation in section on lines 2—2 of Fig. 1;

Fig. 3 is an end elevation in section on lines 3—3 of Fig. 1;

Fig. 4 is an enlarged plan section looking in the direction of the arrows 4—4 of Fig. 2, the set of the teeth of the saw blade being exaggerated for emphasis; and Fig. 5 is an end elevation partly in section to show certain details of the blade advancing and setting element.

Referring to the drawings, a base 10 has legs 11, 12 which rigidly support the fixed jaw 14 of a vise or clamp structure. A movable jaw 15 is supported on legs 16, 17 which pivotally attach to the respective legs 11, 12. As appears in Fig. 3 the center of gravity of the jaw member 15 is such that unless otherwise supported, said jaw member will rotate away from its cooperating fixed jaw 14. The jaws 14 and 15 are preferably coextensive for clamping the blade B over a substantial length as shown.

Disposed adjacent the leg 11 are a pair of aligned posts 18 and 20 which may be integral with the base 10 and which fixedly support a guide rail 21 in such fashion that the center line of said rail is at right angles to the face of the jaw 14. Slidably carried upon said rail 21 is a file-supporting structure 22, which may preferably comprise an elongate channel, the inwardly turned walls 23 of which embrace the underside of the said guide rail. At one end, the channel 22 carries a fixed handle 24 provided with a ferrule 25 provided with openings (not shown) through which extend the tang ends of the files 26 which operate upon the teeth of the saw blades. The holes in the ferrule are such as to properly angularly slope the files so that a working face thereof conforms to the slope of the saw teeth, as shown in Fig. 2. The files are standard slim taper, triangular, files conventionally used in saw filing. Hence, any of the three faces may be placed in engagement with the surface of the saw teeth. Set screws 27 provide for locking the files against movement relative to the ferrule. Fixed upon the surface of the channel 22 is an angle 28 the upwardly extending leg of which is angularly notched to give additional support to the files 26 so that the latter are maintained in desired alignment for the saw filing operation. It will be understood that the teeth of a bandsaw are filed at right angles to the body of the blade, and therefore the travel of the files is at right angles to the plane of the blade. The spacing of the files is such with relation to the extent of advance of the blades that initially, a tooth, such as T, Fig. 2, will jump over the adjacent file as the blade advances to the right, and will not be sharpened until a complete circuit has been made of the bandsaw blade.

Removably secured within the opposite end of the channel member 22 is a limit block 29 secured thereto by a screw 30 which extends through the channel and into one of a series of aligned tapped holes 31 provided in said block. The block limits the rearward draw stroke of the file assembly by abutting against the end of the guide rail 21, and it is obvious that depending upon which of the holes 31 is engaged by the screw 30, the length of travel of the files, and hence the amount of cut, will be appropriately controlled, because with taper files as used in saw filing, the closer to the point of the files the cut is started, the more metal will be removed thereby.

At the opposite end of the base 10, and preferably to the left of the leg 12 as appears in Fig. 1, there is provided a socket 32 which rotatably receives a stud 33 which forms the pivot of the clamping and blade advance lever 34. The head portion of lever 34 has a rigid shoulder 35 to cooperate with a lug 36 extending from the movable jaw 15, and it will be obvious from Fig. 1 that a counterclockwise rotation of the lever 34 will urge the jaw 15 against the fixed jaw 14. The head of the lever also has a fin 37 which is positioned beneath the respective jaws 14 and 15, and which slopes in such fashion that its upper surface conforms to the slope of a tooth of the blade B. The surface of the fin 37 and the respective surfaces of the paired files 26, all of said surfaces being in the same plane, serve as supports for the blade B to maintain the blade in a horizontal position.

Prior to the insertion of a blade between the jaws the handle 34 is rotated clockwise to relieve pressure on the lug 36 and thus to permit the jaw 15 to fall slightly away from the jaw 14. The blade B may then be inserted between the jaws, whereupon it will rest on a three-point support comprising surfaces of the files and the surface of the fin 37.

To guard against upward movement or displacement of the blade B during the filing thereof there are provided a pair of latches 38, 40 pivotally secured to the fixed jaw 14 and having preferably cylindrical studs, 41, 42 which extend through aligned slots 43, 44 provided at the ends of the respective jaw members. Said studs, when the latches are in operative position such as shown in Figs. 1 and 2, bear against the upper edge of the blade B. It will be seen from Fig. 2 that the studs 41, 42 are supported above the bottom of the respective slots by the upper edge of the blade, with the result that said studs press the blade firmly against the files. Preferably, the latches are of the nature of toggles and each therefore has an elongate slotted end 45 and 46 respectively, within which the respective ends of a coil spring 47 are slidably secured. As is apparent from Fig. 2 the line of force of the spring is beneath the axis of rotation of the respective latches and hence the latches are urged into rotation in a direction wherein the studs 41, 42 bear gently but firmly against the top edge of the saw blade. When it is desired to remove the saw blade from the vise it is necessary only to flip the handle ends of the respective latches toward each other whereupon the toggle spring will, when overthrow position is reached, complete the throw and bring the studs 41, 42 well above the top of the jaws for subsequent removal of the saw blade.

As is known in the art, the standard "set" of the teeth of a saw blade, and particularly a bandsaw blade, is "regular alternate," that is, one tooth is turned slightly to the left and the next equally to the right, as is shown in exaggerated manner in Fig. 4. The teeth should be turned just enough to insure a free, smooth, and rapid cut in a slot a little wider than the blade itself, removing no more of the stock being cut than is necessary. Ordinarily, resetting is done by hand, using a standard vise and a nailset.

The present invention provides means for automatically setting the saw teeth as the clamp is operated to secure the saw blade. Accordingly, there are provided on the respective legs 12 and 11 screws 48 and 49, which are in a common plane but oppositely inwardly directed and laterally spaced equal to the spacing between adjacent saw teeth.

The respective screws are spaced relative to the files to insure that as the saw blade is advanced preparatory to filing the teeth to be set, and the teeth to be filed, are in their proper locations with respect to the agencies which are to act thereon. The operating faces of the screws are rounded to give a suitable pressure application point without scoring or damaging the side walls of the saw teeth. It is apparent that when the handle 34 is rotated to bring the jaw 15 into clamping position against jaw 14, the respective screws bear against the face of the adjacent saw teeth (see Fig. 4) to bend the same in the proper direction to establish the set thereof.

The respective screws 48 and 49 may be adjusted according to the desired angle of set of the teeth.

When the file assembly handle drawn rearwardly to the extent permitted by block 29 and the saw blade ratcheted ahead by rotating lever 34 to the left of Fig. 1 so that fin 37 moves the blade B to the right, the handle is swung to the right, to clamp the blade firmly within the vise. Then the handle 24 is propelled manually forward until ferrule 25 abuts jaw 15, whereupon the sharpening is completed. The taper of the forward end of the file does most of the cutting, and the more parallel rearward file body dresses the cut. A single stroke of the file is all that should be required to regrind the tooth square with the blade and restore the "briar point" thereof. After the redraw of the file handle, lever 34 is rotated to the left of Fig. 1, whereupon the lug 35 will disengage from the shoulder 36, relaxing the grip of the vise, and the edge of the fin 37 will engage the adjacent edge of a tooth and will again propel the blade a fixed distance toward the files. The saw blade in effect "ratchets" over the surfaces of the files, the spring 47 being relatively light to permit upward movement of the blade B during the advance thereof. It will be understood that the lug 35 is so related to the action of the fin 37 that the advance of the blade is completed immediately before the saw blade is re-clamped. This is best shown in Fig. 2, where it appears that when the clamp is fully closed, the right hand edge of the fin 37 has disengaged from the vertical wall of the adjacent tooth. The return swing of the handle 34 causes the fin 37 to come into position with respect to a tooth of the saw blade for the next advance of the blade, and at the same time exerts the clamping action and the setting action upon the blades.

It is preferable that the extent of advance of the blade relative to the spacing of the files should be such that no tooth is filed twice; in other words, a tooth that has been filed by the left hand file in Fig. 1 should skip over the right hand file as the blade is advanced from left to right. By making an index mark on the blade previous to performing the first filing operation, the completion of a full circuit of the blade such as a bandsaw blade can be determined. Just prior to the end of the circuit, the tooth which had not been filed at the start will come into registry with one of the files.

In the illustrated embodiment, the lever 34 will advance the saw blade two teeth at each action. The engagement of the fin 37 with the leg 12 will limit the advance of the blade, or a suitable stop 50 extending downwardly from the head of lever 34 may ride within an arcuate slot 51 in the socket 32 to limit the movement of the fin 37 for uniform advance of the saw blade. Inasmuch as the setting studs 48 and 49 operate on consecutive teeth, a minimum of teeth will be subjected to a second setting action by the studs.

It is apparent, of course, that one file, or more than two files may be mounted on the file side, although easier operation results from using two files, as shown.

Although the invention has been described by making a fully detailed reference to a certain presently preferred embodiment, such detail of description is to be understood in an instructive rather than a limiting sense, many changes being possible within the scope of the claims hereto appended.

I claim:

1. A saw filing and setting device, comprising a vise arranged to receive a saw blade and including a fixed jaw supported upon a base, a movable jaw mounted for movement toward or away from said fixed jaw; a file mount supported on said base for movement in a plane in predetermined angular relationship to the plane of the vise jaws, said file mount having filing means removably carried thereby; means pivotally mounted on said base and engageable with the movable jaw to urge the same into clamping relationship with the fixed jaw; spring biased means engageable with an edge of said saw blade for resiliently urging said saw blade into engagement with said filing means; oppositely disposed studs mounted respectively on said fixed jaw and said movable jaw and respectively engageable with saw teeth at opposite sides of said blade to equally and oppositely bend adjacent saw teeth during the movement of said movable jaw into clamping position; and an end portion of said pivotally mounted means disposed in tooth-engaging relationship with respect to said saw blade to advance said blade a predetermined amount to move unsharpened teeth in the direction of said files.

2. A saw filing and setting device comprising a vise having jaws movable relative to each other for clamping a saw blade in position to be sharpened, saw tooth setting means disposed on the respective jaws of said vise and arranged respectively to engage opposite sides of adjacent saw teeth to bend said adjacent teeth in respectively opposite directions when said jaws are brought into clamping relationship, reciprocally mounted file means disposed in fixed relationship with respect to said vise, a lever arranged for arcuate movement in two directions, said lever moving a jaw of said vise into clamping relationship with the other jaw upon movement of said lever in one direction and relaxing said clamping relationship upon movement in the other of said directions and having means engaging with one of said saw teeth to propel unsharpened teeth of the saw blade toward said files upon movement of said lever in said other direction, and means engaging with the back of said saw blade to urge said blade against said file means.

3. A saw filing device, including a vise member having relatively movable jaws to receive a saw blade therebetween; a file mount fixed relative to said vise member and having a slide thereon movable in a fixed path with respect to said vise means; means for securing a pair of files on said slide in fixed, mutually spaced relationship; a clamping and saw-advancement lever pivotally mounted with respect to said vise and having a head portion engageable with a tooth of said saw blade, the surface of said head and the operating surfaces of said respective files sloping in conformity with the slope of said saw teeth; and spring pressed latch means mounted on said vise member and bearing against said saw blade to urge the same against the head of said lever and the operating surfaces of said files.

4. A saw filing device, including a vise member having a fixed and a movable jaw, and arranged to secure a saw blade to be filed; saw filing means secured relative to said vise member and including means for mounting a file for operation on the teeth of said saw blade; means releasably engageable with the back of said saw to urge said saw blade toward said file; and means for relaxing said vise member and concurrently advancing unsharpened teeth of said blade toward said filing means.

5. A saw filing device, including a vise having a fixed jaw and a movable jaw to receive a saw blade therebetween; file means mounted for reciprocation relative to said saw teeth for sharpening the same; and a lever pivotally mounted with respect to said movable jaw and having a lug engageable with said jaw to urge the same into clamping relationship against said saw blade when said lever is rotated in one direction and having a fin engageable with a tooth of said saw blade to advance unsharpened teeth of said blade toward said files when said lever is rotated in the opposite direction; the lug of said lever disengaging with said jaw to relieve pressure thereon prior to the engagement of said fin with said tooth, whereby the vise is in relaxed or unclamping position prior to the advancement of said saw blades.

WILLIAM H. HARLESS.

REFERENCES CITED

The following references are of record in the file of this patent:

UNITED STATES PATENTS

| Number | Name | Date |
|---|---|---|
| 107,872 | Chance et al. | Oct. 4, 1870 |
| 418,874 | McIntire | Jan. 7, 1890 |
| 432,455 | Timberman | July 15, 1890 |
| 445,858 | Parry | Feb. 3, 1891 |
| 566,290 | Batcock | Aug. 25, 1896 |
| 853,988 | Miller | May 21, 1907 |
| 1,409,442 | Hausler | Mar. 14, 1922 |
| 1,454,893 | Jackson | May 15, 1923 |
| 1,574,032 | Hernes | Feb. 23, 1926 |
| 1,719,351 | Wood | July 2, 1929 |
| 2,286,098 | Knutson | June 9, 1942 |